United States Patent

Singer

[15] 3,657,044
[45] Apr. 18, 1972

[54] METHOD OF THERMOPLASTIC COATING OF MOLDED PULP

[72] Inventor: Max E. Singer, Mattapan, Mass.
[73] Assignee: Keyes Fibre Company
[22] Filed: July 16, 1969
[21] Appl. No.: 847,502

Related U.S. Application Data

[63] Continuation of Ser. No. 376,150, June 18, 1964, abandoned.

[52] U.S. Cl..............................156/212, 156/214, 156/227, 156/267, 156/285, 156/382, 156/475, 161/42, 161/44, 161/125, 161/149, 161/164, 229/2.5, 264/92, 264/263
[51] Int. Cl....................B29c 17/04, B32b 1/02, B32b 1/04, B32b 31/04, B32b 31/20
[58] Field of Search................161/42, 43, 44, 125, 149, 164; 156/213, 216, 224, 285–287, 212, 214, 227, 267, 382, 475; 264/90, 92, 101, 102, 267–269, 263; 18/19 E, 19 F; 229/2.5, 5.5, 14; 162/103

[56] References Cited

UNITED STATES PATENTS

| | | | |
|---|---|---|---|
| 2,319,267 | 5/1943 | Sawyer | 156/224 UX |
| 2,590,221 | 3/1952 | Stevens | 156/196 |
| 3,205,123 | 9/1965 | Hornbostel | 156/287 X |
| 3,318,748 | 5/1967 | Hurst | 156/224 |

Primary Examiner—William A. Powell
Attorney—Connolly and Hutz

[57] ABSTRACT

A method of coating a contoured portion of a generally porous molded pulp article having sloping side and flat bottom wall portions with generally imperforate thermoplastic material to achieve a superior bonded product. First the article to be coated is placed against an open-face suction die, a flat continuous sheet of thermoplastic material is then placed in overlying relationship with the exposed portion of the die-supported article, the temperature of the thermoplastic material is raised to the range where it is sufficiently ductile to closely conform with the contoured portion of the molded pulp article, the thermoplastic material is suction adhered into intimate physical contact with the article without undesireable pleats or folds, a closed chamber is created around the article and its adhered thermoplastic material with the open-face suction die forming a portion thereof, the pressure within the closed chamber is increased to act against the exposed portion of the thermoplastic material with a pressure at least twice atmospheric pressure, and finally the temperature of the thermoplastic material continues to be raised until a mechanical bond with the contacted pulp is effected which is characterized in the finished product by a substantially uniform penetration of thermoplastic material into the adjacent pulp material on the sloping side as well as the flat bottom wall portions and the penetration of fibrous pulp material into the adjacent side of the thermoplastic material is also substantially uniform as to both quantity and depth of penetration on the side as well as the bottom wall portions so that a substantially equal amount of force is required to forceably separate the thermoplastic as a sheet from a given area of the bottom wall portions and from a given area of the side wall portions, and so that a substantially uniform amount of pulp material per area unit adheres to the thermoplastic material from the side as well as the bottom wall portions at any place over the bonded surface of the thermoplastic material when it is forceably separated as a sheet from the remainder of the product.

5 Claims, 9 Drawing Figures

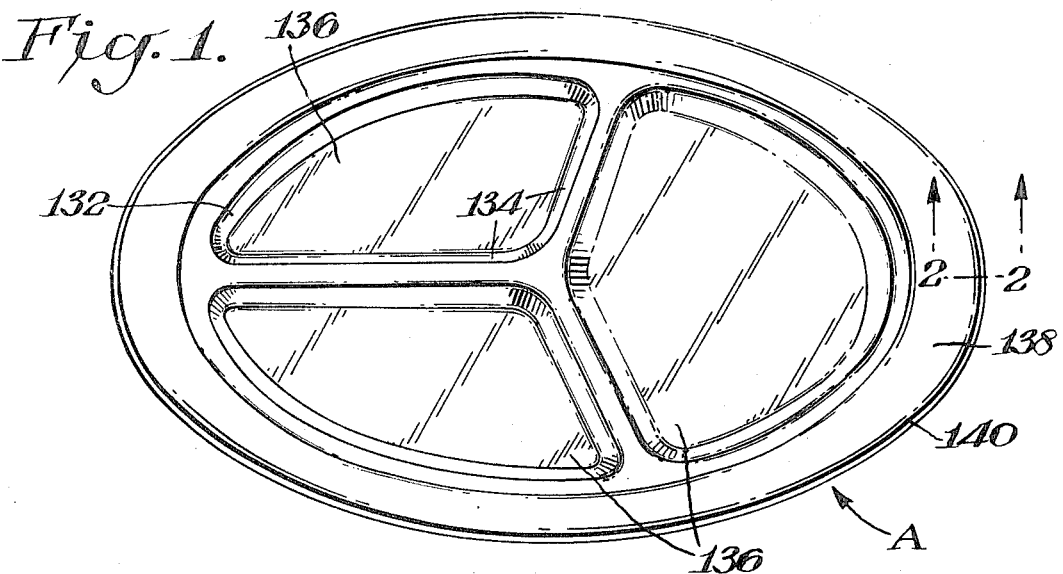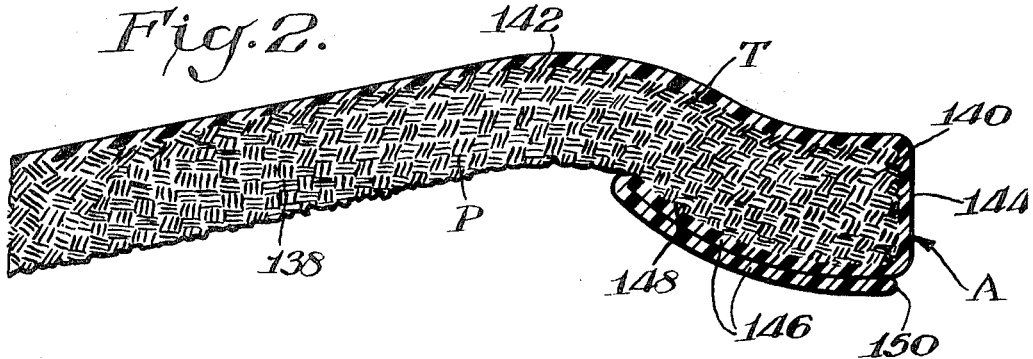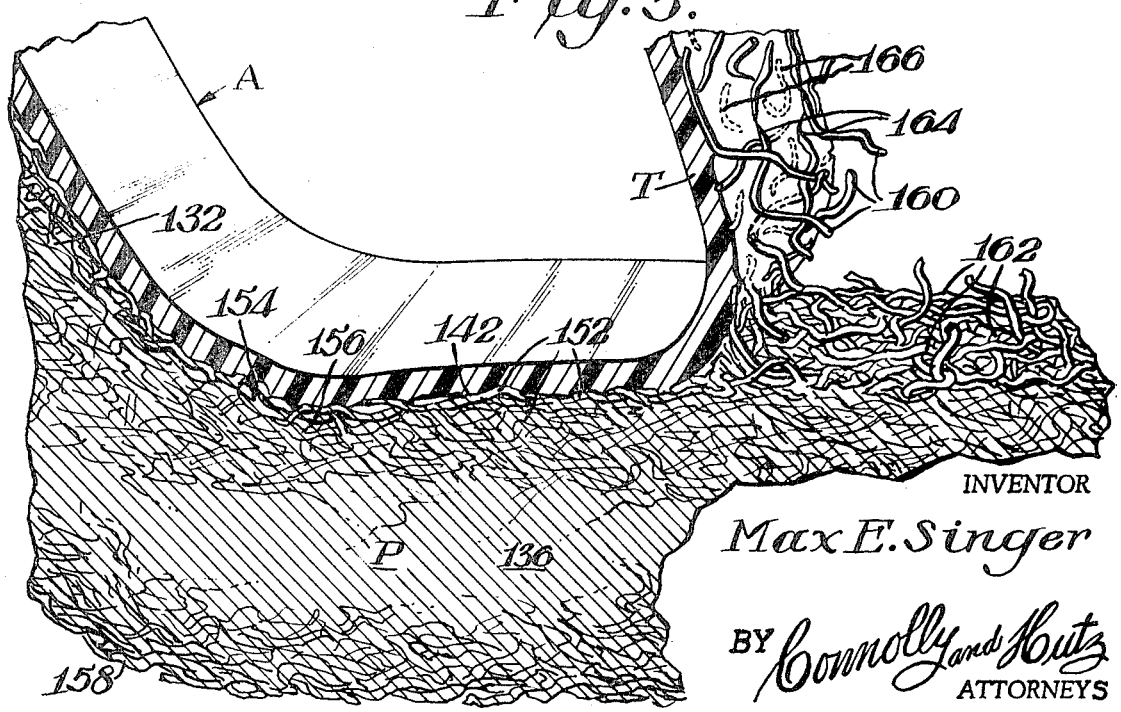

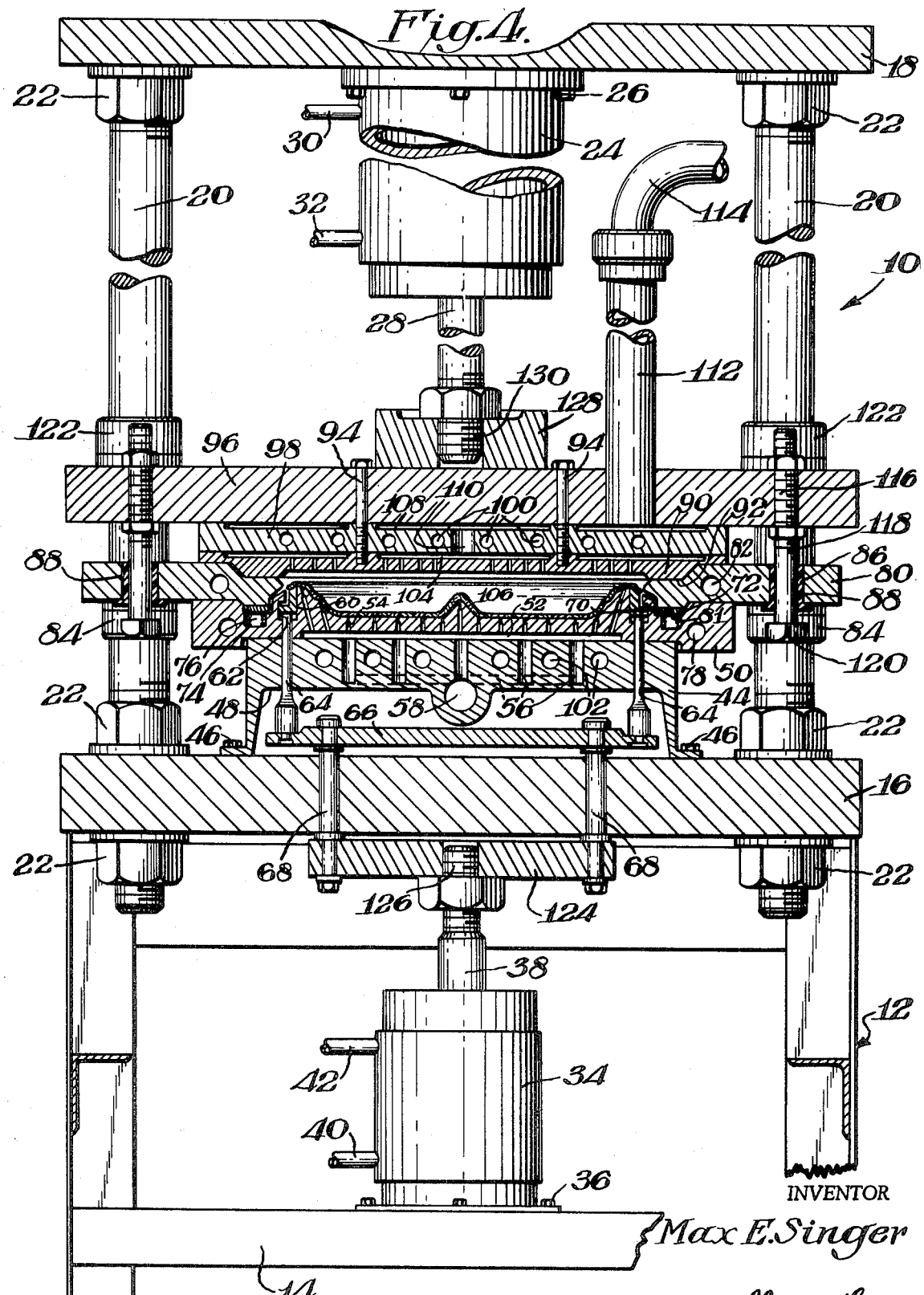

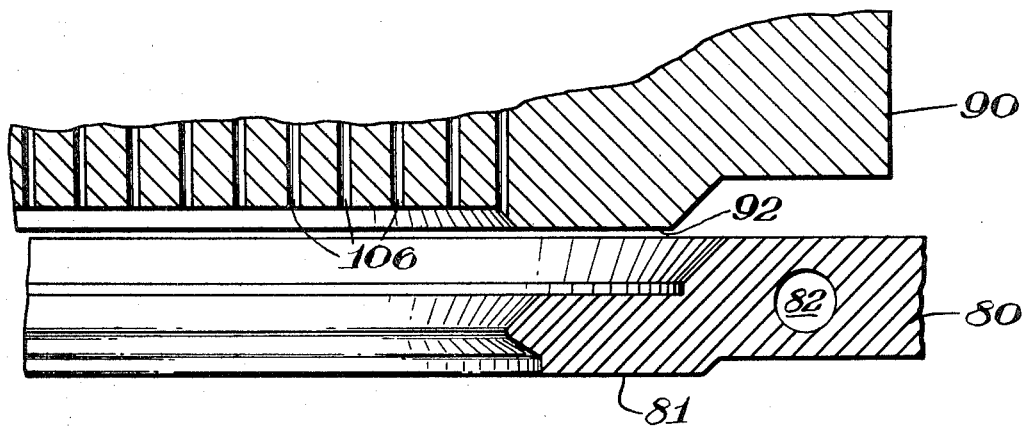
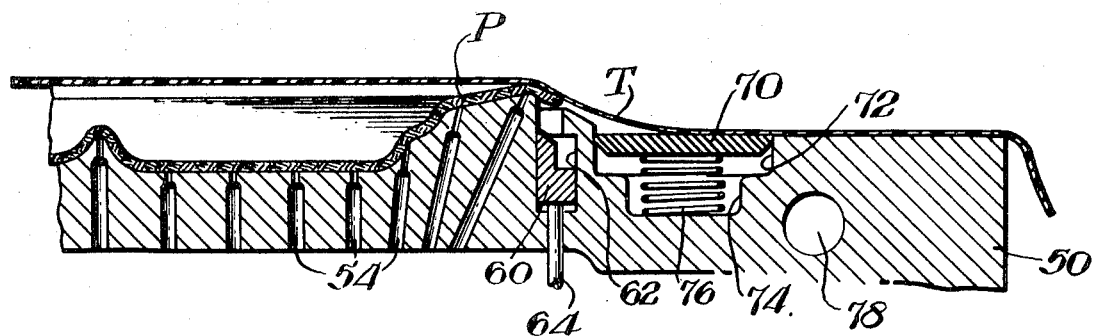
Fig. 5.

INVENTOR
Max E. Singer
BY Connolly and Hutz
ATTORNEYS

METHOD OF THERMOPLASTIC COATING OF MOLDED PULP

This is a continuation of application Ser. No. 376,150 filed June 18, 1964, now abandoned.

This invention relates to thermoplastic coating of porous articles, and more particularly to laminating sheets of generally imperforate thermoplastic material by heat and pressure to contoured molded pump articles.

Materials such as molded pulp have been popular for fabricating a wide range of articles for many years. Because of the light weight, easy disposability, low thermal conductivity, relatively low cost, ability to be fabricated in various shapes and colors, and other well-known advantages of molded pulp, it has met with consumer acceptance in many fields.

It has been recognized, moreover, that it is highly beneficial to be able to unite appropriate materials to particular pulp articles for a number of reasons such as to render them resistant to many different substances having divergent wetting, chemical, temperature and other characteristics to which untreated molded pulp along would not be resistant. For instance, certain molded pulp articles such as receptacles or containers are adapted to a wider range of uses if they are rendered resistant to various substances, such as hot liquids and the like. As a result, proposals have been advanced from time-to-time which purport to adhere materials which are resistant to hot liquids and the like directly to molded pulp articles to render them resistant to such substances.

Unfortunately, many such proposals have proved unsatisfactory for high volume commercial applications. In the first place, it is difficult to adhere uniform or even coatings of moisture resistant materials such as thermoplastics to deeply contoured molded pulp articles in a commercially satisfactory manner. Dipping molded pulp articles in liquid thermoplastic, for example, is not satisfactory because of the high absorption qualities of molded pulp which frequently cause unreasonably large percentages of molten thermoplastic to saturate the article, and it is practically impossible to dip only the inside of a deeply dished article. Spraying the articles with liquid thermoplastic frequently results in uneconomically thick coatings of thermoplastic on the surfaces of the articles which are disposed at right angles to the direction of spray, with unsatisfactorily thin coatings on the surfaces which are sharply sloped or angled to the direction of spray. Other proposals which attempt to laminate preformed sheets of thermoplastic material to contoured articles encounter other problems. Pressing dies designed to compress preformed sheets against contoured articles must, of course, be matingly contoured. However, it can be appreciated that such dies properly compress the thermoplastic sheets against the molded pulp only in planes which are essentially transverse to the direction of die pressure. Portions of the articles which are sloped or angled to the direction of die pressure do not receive adequate pressing die force, especially with articles on the thin side of normally encountered production tolerances; and, articles on the thick side of such tolerances cause the dies to fit too tightly at sloped areas resulting in tearing of the thermoplastic sheets. Additionally, it is extremely difficult to closely conform preformed sheets of thermoplastic material to the shape of deeply dished or otherwise contoured molded pulp articles without producing pleats or creases which result in zones of triple thickness thermoplastic of a highly unsatisfactory nature. Finally, the use of suction dies to help preshape and position the sheets of thermoplastic material properly relative to the molded pulp articles has not heretofore overcome the creasing and pleating problem or the problem of non-uniform die pressures at different portions of contoured articles.

Accordingly, it is an object of the present invention to provide coatings of thermoplastic material on molded pulp articles wherein a substantially uniform thickness of thermoplastic material is securely heat and pressure bonded evenly over the most irregularly and deeply contoured articles.

Another object of the present invention is to provide a method of coating generally porous molded pump articles with sheets of generally imperforate thermoplastic material without the use of mechanical pressing dies.

Another object of the present invention is to provide apparatus for heat and pressure bonding sheets of generally imperforate thermoplastic material to a wide range of contoured generally porous molded pulp articles.

Another object of the present invention is to provide a unitary coated article comprising a main body of generally porous molded pulp having a surface layer of generally imperforate thermoplastic material evenly heat and pressure bonded across a full face portion as well as around the lateral margin of the article.

Other objects and advantages of the present invention will become apparent to one skilled in the art from a reading of the following description in conjunction with the accompanying drawings wherein similar reference characters refer to similar parts, and in which:

FIG. 1 is a perspective view of an exemplary unitary coated product formed according to this invention;

FIG. 2 is a fragmentary sectional view on line 2—2 of FIG. 1 on an enlarged scale showing the manner in which thermoplastic material may be conformed around the edge of a molded pulp article;

FIG. 3 is a fragmentary sectional view of the product of FIG. 1 on a greatly enlarged scale showing the manner in which thermoplastic material is mechanically bonded with the surface layers of pulp material;

FIG. 4 is a sectional elevational view of apparatus adapted to perform the method of this invention to produce the product of this invention;

FIG. 5 is a semi-schematic fragmentary sectional elevational view illustrating a first step in a coating method of this invention;

Figure 6:
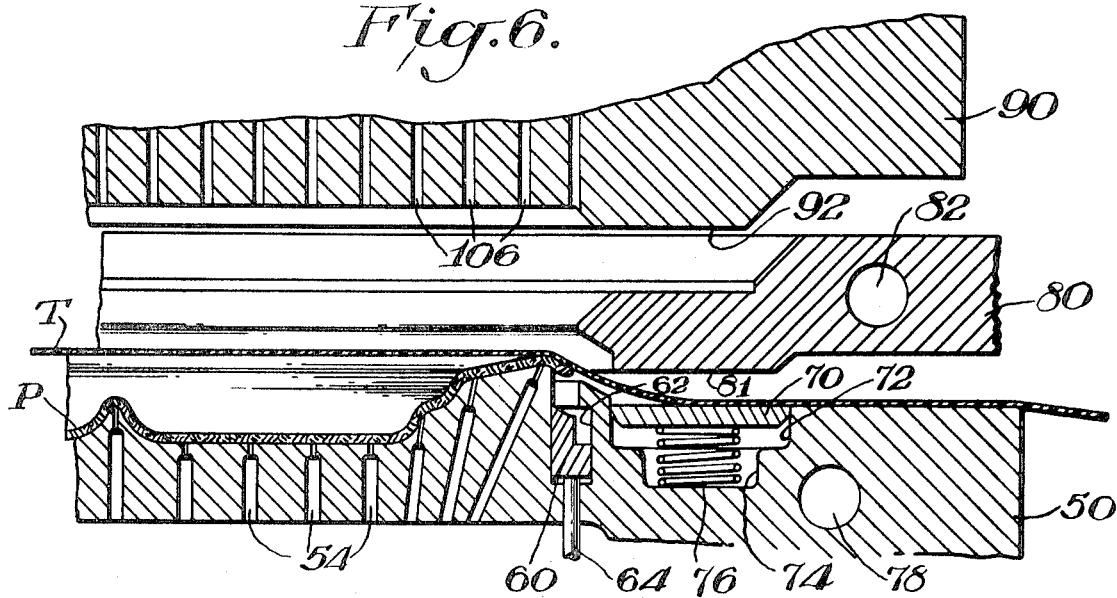
FIG. 6 is a fragmentary sectional elevational view similar to FIG. 5 illustrating another step in the coating method.

Molded pulp articles adapted to be coated with thermoplastic material according to this invention may comprise any of the well-known varieties of wood, paper or other pulp materials either natural or synthetic. Such materials are customarily collected in the form of an aqueous slurry on open-faced suction forming dies, the suction applied to the pulp slurry deposited on the wire face drawing a large percentage of water from the articles. Thereafter, the articles are shifted to mating transfer dies where heat and suction may be applied to subtract more water from the articles. Finally, the still damp pulp articles are deposited on a conveyor belt which transfers them through a heated drying chamber to drive out the remaining water. Additionally, if desired, further after-pressing and other forming operations may be performed on the articles to compress and smooth at least the surface layers of pulp to produce a more uniform and even finish on the articles. While articles manufactured according to the foregoing process are used as examples herein, it will be clear upon reading the following detailed description that other manufactured articles of any equivalently porous material are well suited to coating according to the principles of this invention.

Also, the shape of the porous articles which may be coated according to this invention encompasses a wide range. While perfectly planar articles obviously may be coated, this invention uniquely lends itself to coating deeply contoured or other irregular shapes. The color, thickness, over-all size and character or quality of the porous articles do not critically effect the success of the present invention.

The porous articles of whatever configuration or material are coated with a sheet of thermoplastic material. The thermoplastic material preferably used in the practice of this invention is in the nature of an organic or inorganic plastic in flexible sheet form having thermoplastic properties. While several specific examples are spelled out in detail below as being illustrative of suitable thermoplastic films, it will be appreciated that any other material exhibiting similar or equivalent characteristics may be employed. For instance, such films advisably have a minor capacity for elongation or stretching when subjected to temperature sufficiently low, such as room temperature, that they may be classified as solid. In somewhat higher temperature ranges, most of such thermoplastic materials become ductile whereby they are subject to further elongation, usually without total recovery. Even higher on the temperature scale, such thermoplastic materials become truly plastic wherein they are tacky and may be contoured and subjected to flow somewhat in the manner of an extremely viscous liquid. Finally, for most such thermoplastic materials, before the point is reached on the temperature scale where they become a gas, many such materials experience a liquid phase, which is characteristically within an extremely narrow range on the temperature scale. While not all thermoplastic materials which could be suitably adhered to porous material such as molded pulp according to the principles of this invention necessarily include each and every one of the above suggested phases, such phases describe characteristics of currently available commercial thermoplastic materials obtainable in sheet or film form which have proved satisfactory. The thermoplastic sheet material employed may be transparent, translucent, or even opaque. Colors or other designs may readily be employed either on the article to be coated or on the thermoplastic itself without effecting the success of the invention. Finally, the material used is advisably relatively imperforate, or impervious to the passage of fluids therethrough, this quality being precisely the quality lacking in porous molded pulp which is not coated or otherwise treated to be moisture resistant for use as receptacles or containers.

Basically, the process according to this invention involves laying a sheet of such imperforate thermoplastic material over the side or face of a porous molded pulp article which is to be coated. The thermoplastic material advisably is heated to the point where it is sufficiently ductile that it may be forced by low pressure, such as vacuum applied to the other side or face of the porous article, into strict conformity with the contour of the article. If desired, the sheet of thermoplastic material may be tucked under the rear surface of the article around the periphery thereof, as described below. Thereafter, the thermoplastic material is heated further until it reaches the plastic range. Additionally, the air or other fluid medium on the exposed side of the thermoplastic material opposite the molded pulp is pressurized to a sufficiently high super-atmospheric value that the thermoplastic material is in intimate physical contact over the entire face of the article to be coated. This pressure, which acts in all directions and even against the most deeply or interlocking of the thermoplastic material and the molded pulp evenly throughout the extent of their interface when the increasing temperature has reached a point in the plastic range where fusing or bonding of the thermoplastic material with the pulp is attained.

Purely by way of example, the following apparatus is disclosed to illustrate one way in which a method of coating according to this invention may be carried out on an automatic or commercialized bases. Referring specifically to FIG. 4, an exemplary machine 10 for thermoplastic coating of molded pulp includes a main framework 12 supporting a generally horizontal base member 14 and a generally horizontal intermediate member 16 spaced thereabove. An upper generally horizontal member 18 is supported in fixed positional relationship with the intermediate member 16 by a plurality of guide rods 20. The rods 20 include threaded ends which are secured by nuts 22 to the members 16 and 18.

An upper motivator such as a piston and cylinder type fluid motor 24 is secured as at 26 to the upper frame member 18 so that extension and retraction of its piston rod 28 by fluid admitted through suitable connections 30,32 will impart motion to a reciprocating plate, described below. The lower frame member 14 supports a motivator such as a piston and cylinder type fluid motor 34 secured as at 36 thereto so that extension and retraction of its piston rod 38 by fluid introduced through suitable connections 40,42 will impart limited reciprocatory motion to a rim pressing ring, described below.

A die support and heating member 44 secured as at 46 to the intermediate horizontal frame member 16 includes an inner chamber 48 adapted to receive motion transmitting mechanism. The upper surface of the die support member 44 is adapted to position a vacuum die 50 in fixed positional relationship on the framework. The lower surface of the vacuum die 50 is recessed at 52 to form a vacuum manifold chamber. A plurality of vacuum ports 54 connect the contoured upper surface of the die 50 with the manifold chamber 52. A second series of vacuum ports 56 in the die support member 44 connected at their upper ends with the chamber 52 and at their other ends with a conduit 58 connected in conventional fashion with a vacuum pump, not shown, to provide a suitable source of suction.

A rim pressing ring 60 of generally L-shaped cross-sectional configuration is positioned for limited vertical reciprocation in an annular cavity 62 suitably formed in the die 50. The uppermost surface of the ring is contoured to form a die portion. The pressing ring 60 is attached by connecting rods 64 to a spreader yoke 66 in the support chamber 48, which in turn includes depending connecting rods 68.

A film squeeze ring 70 is positioned for limited vertical travel in an annular cavity 72 in the die 50 concentrically surrounding the cavity 62. A plurality of circumferentially spaced spring pockets 74 in the base of the cavity 72 are adapted to house coil springs 76 which yieldably position the ring 70 in its upward position, as explained below. The lower die 50 includes a passage 78 for cooling fluid around its outer periphery.

A spacer and film squeeze ring 80 positioned above the die 50 also includes a passage 82 for cooling fluid as well as an annular depending boss 81 adapted to engage the ring 70 to form the first abutment portion of a lost motion connection. A plurality of slide bearing members 84 secured to the lower surface of the ring 80 surround the vertical guide rods 20 to permit vertical sliding motion of the ring 80. A plurality of vertical bores 86 through the ring are press-fitted with bottom flanged sleeve members 88 to form the second abutment portion of a lost motion connection, described below.

A chamber member 90 including a lower abutment surface 92, forming the third portion of a lost motion connection, adapted for engagement with the upper surface of the spacer ring 80 is secured by bolts 94 to a reciprocating plate 96. A heater plate 98 is sandwiched by the bolts 94 between the chamber member 90 and its supporting plate 96. Heater elements 100 are integrally associated with the heater plate 98, and heater elements 102 are integrally associated with the above described die support member 44. The upper surface of the upper die 90 is recessed at 104 to provide a fluid manifold which is connected by suitable ports 106 with the lower or exposed surface of the die 90. The upper surface of the heater plate 98 is recessed to provide a fluid manifold chamber 108 which is connected by a suitable port 110 with the chamber 104. Conduit means 112 including a flexible connection 114 connect with a compressor, not shown, to provide a suitable source of fluid pressure. A plurality of vertical bores 116 in the member 96 support adjustable rod members 118 having flared heads 120 at their lower extremity to form the final abutment portion of a lost motion connection. The rods 118 are aligned with and extend through the sleeves 88 of the spacer ring 80 with the head portions 120 adapted for abutting engagement with the flanged lower lip of the sleeves 88. A plurality of slide bearing members 122 secured to the upper surface of the reciprocating support plate 96 mount the plate for sliding motion on the guide rods 20 of the frame.

The connecting rods 68 for the squeeze ring 60 are connected to a spanner plate 124 which in turn is connected at 126 with the piston rod 38 of the lower motor 34. A connecting block 128 secured to the upper surface of the reciprocating support 96 is connected at 130 with the piston rod 28 of the motor 24.

Purely for purposes of illustrating this invention, the article coated with thermoplastic material is illustrated herein as a container or receptacle such as an eating plate of the variety having ribbed partitions for subdividing the central recessed portions thereof into separate compartments. As seen in the drawings, the upper surface of the vacuum die 50 is contoured to matingly engage and support the lower or under surface of such an article. The squeeze ring 60 is positioned so that the uppermost surface thereof may engage the lower portion of the peripheral or marginal flanged rim of such an article. The lower surface of the chamber member 90 is recessed so as to be spaced substantially above the contoured pulp article when in the lower position. The vertical thickness of the spacer ring 80 between the surfaces 81 and 92 is such as to maintain proper spacing of the chamber member 90 above the die 50.

Referring to FIGS. 5-9, the operation of the above described apparatus illustrates one possible sequence included within the method of this invention. As seen in FIG. 5, at the beginning of a cycle of operation the upper fluid motor 24 retracts the chamber member 90 until it is spaced considerably above the vacuum die 50. The expanded portions 120 of the rods 118 which form the lost motion connection also serve to elevate the spacer ring 80 from 1 to 9 inches above the die 50. The lower fluid motor 34 retracts the pressing ring 60 to its lower extent of travel within the cavity 62. The ring 70 is positioned at its upper limit of travel in the annular groove 72 by means of the springs 76 in the spring pockets 74. In this condition, the apparatus is ready to commence cycle of operation for the thermoplastic coating of porous articles.

First, a contoured article of generally porous material P, such as a partitioned molded pulp plate, is placed on the upper surface of the vacuum die 50 which, as mentioned above, is contoured to matingly engage and support the lower surface of such an article. Then, a sheet of generally imperforate thermoplastic material T which is to form the top surface of the finished article is positioned across the die supported plate P. At the time the plate is positioned on the lower die 50, the die is advisably pre-heated to a desired range of from 250° to 400° F. which may vary with different thermoplastic materials depending upon the fusing point thereof. Additionally, if desired, the chamber member 90 may also be pre-heated to the 250° to 450° F. range at the beginning of the cycle of operation. As soon as the plate is positioned in the heated die, it will be apparent that the temperature of the plate itself begins to increase. Similarly, the temperature of the sheet of thermoplastic material also increases because of its proximity to the heated die and chamber member as well as the plate.

In FIG. 6, the upper fluid motor 24 has extended its piston rod 20 to move the chamber member 90 as well as the depending spacer ring 80 into relatively close proximity, advisably less than 1 inch, to the supported plate and sheet of thermoplastic. There, if desired, downward motion of these two members may be interrupted to further elevate the temperature of the thermoplastic and the plate for from 1 to 10 seconds.

Figure 7:
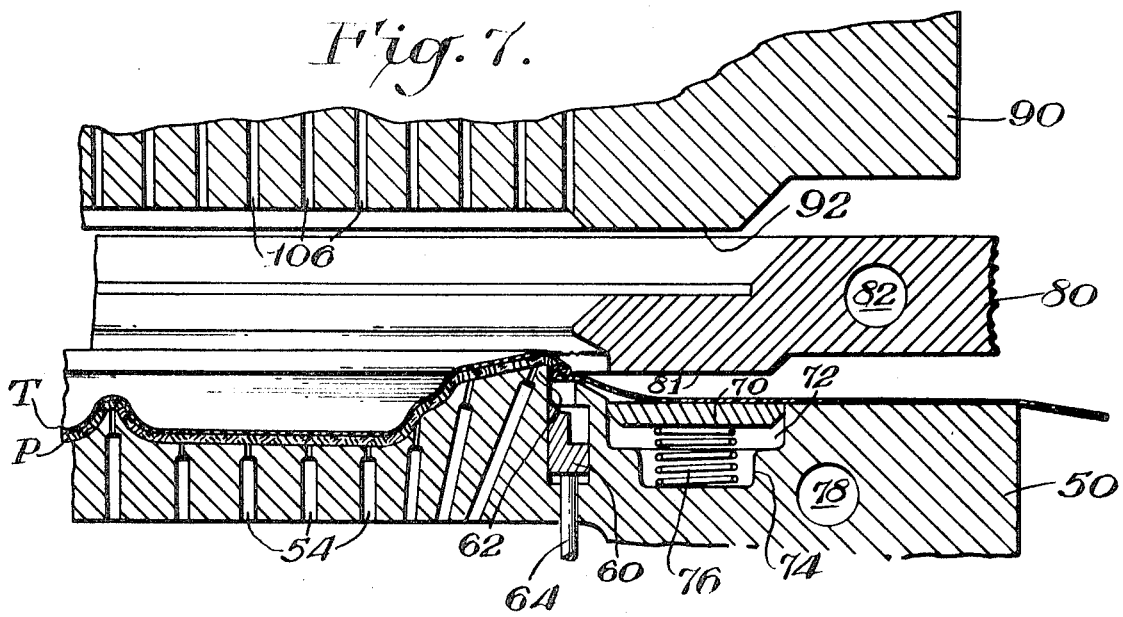
FIG. 7 is a fragmentary sectional elevational view similar to FIG. 5 illustrating another step in the coating method.

In FIG. 7, when the thermoplastic material has been heated to the point where it is sufficiently ductile to be stretched into intimate mating engagement with the contoured article, vacuum or suction from the source 58 is applied at approximately 20-25 inches of mercury by means of the ports 54 to the lower side of the porous article. Because of the porosity of the article, the ductile thermoplastic material is pressurized into intimate engagement with the upper surface of the porous article. Depending upon the efficiency of the vacuum, it will be clear that such pressure must be at least somewhat below normal ambient atmospheric pressure. Such sub-atmospheric pressure is sufficient to conform the thermoplastic against every contour of the porous article without pleating or creasing if the proper point in the ductile range of the particular thermoplastic material is reached before vacuum is applied.

It will also be noted that the presence of the cavity 62 permits the thermoplastic material to wrap around the peripheral flanged rim of the plate, by means of vacuum transmitted through the porous rim, to at least a point defined by the inner wall of the cavity 62. This provides a double thickness of thermoplastic on the lower side of the rim of the article, as well as a single thickness of thermoplastic material on the vertical outer edge of the article. At this point, it will be appreciated that the temperature in the zones occupied by the materials to be bonded is continuing to increase into the range where the thermoplastic material attains a truly plastic or tacky characteristic.

Figure 8:
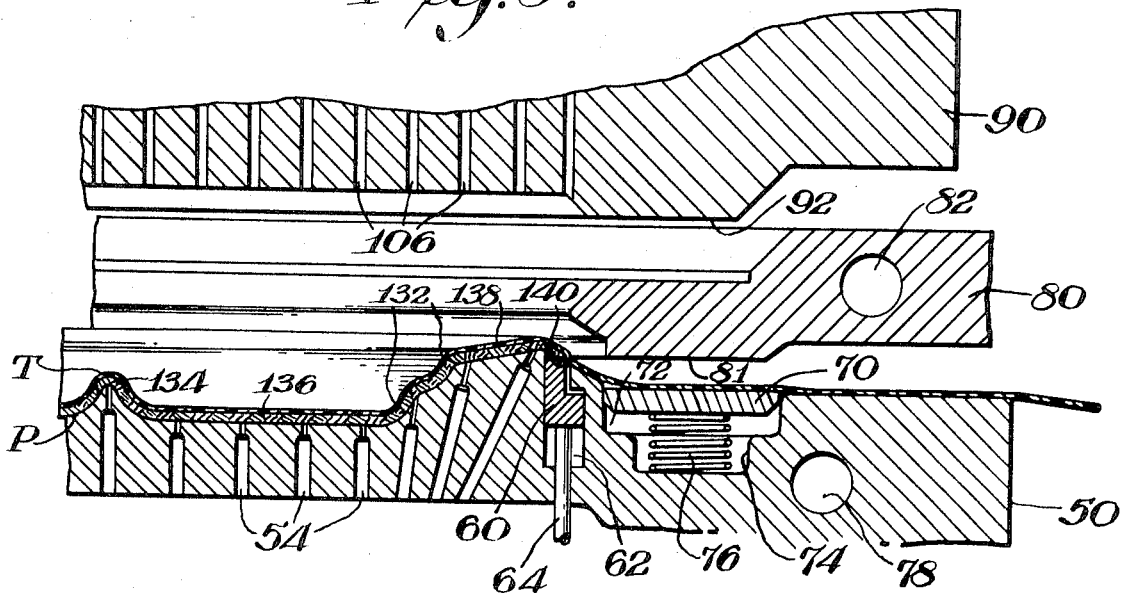
FIG. 8 is a fragmentary sectional elevational view similar to FIG. 5 illustrating another step in the coating method.

In FIG. 8, the lower fluid motor 34 at this point extends the pressing ring 60 to the upper extent of its limited travel in the cavity 62 to engage the double underwrapped thermoplastic material around the lower side of the rim of the article. The ring 60 presses upwardly with a force sufficient to bond the lower layer of thermoplastic material to the upper layer, and the upper layer to the porous pulp material when the proper temperature is attained, and with a force sufficient to co-act with the rings 70 and 80 to sever excess film, as described below. The upward force of the squeeze ring 60 reacts against the relatively rigid rim of the plate, which is held in tight engagement with the die 50 by the vacuum applied through the ports 54. While the temperature of the zone occupied by the thermoplastic material and the porous pulp material is continuing to rise, the passages 78 and 82 continually conduct cooling fluid to maintain the excess thermoplastic material beyond the margins of the article sufficiently below the plastic range.

Figure 9:
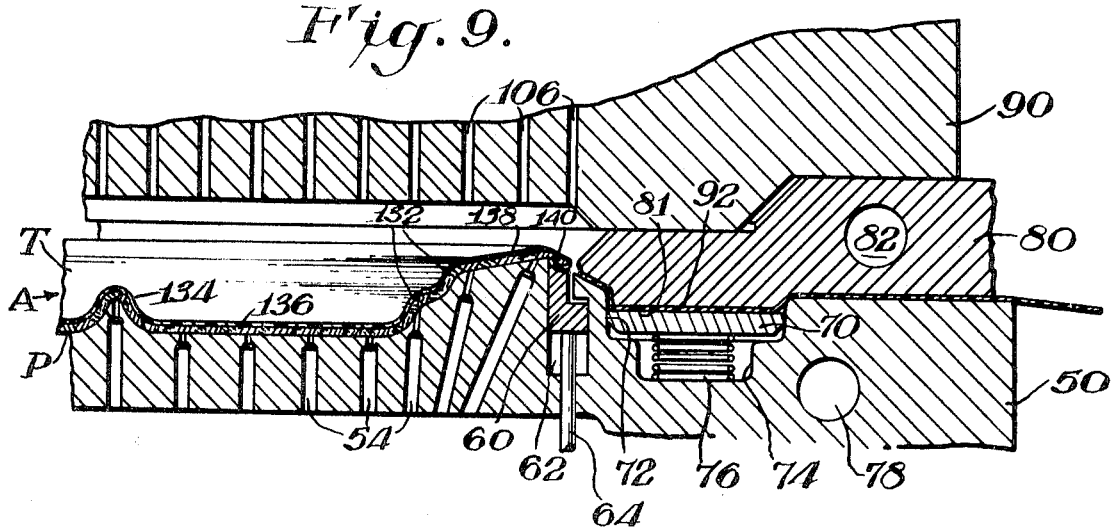
FIG. 9 is a fragmentary sectional elevational view similar to FIG. 5 illustrating a final step in the coating method.

In FIG. 9, the upper motor 24 has again been activated to continue lowering the member 90. The spacer ring 80 first contacts the thermoplastic material outside the article to be coated in the zone above the annular ring 70 as the upper die 90 continues to descend, the lost motion connection established at 88, 118, being taken up to permit the member 90 to overtake the spacer ring 90 and close thereupon. As the member 90 closes upon the spacer ring 80, the ring 70 is moved to its lower extent of vertical travel, the coil springs 76 being depressed in their pockets 74. As this happens, the temperature of the thermoplastic material in the zone of the article to be coated is sufficient that the material readily divides at the rim of the article. As can be appreciated, the excess material beyond the boundaries of the plate is clamped between the spacer ring 80 and the ring 70, and downward motion of the clamped film in the cavity 72 serves to forceably pull excess thermoplastic material away from the coated article.

Additionally, it will be noted that the closing of the chamber member 90 on the spacer ring 80, and the ring 80 on the lower die 50, creates a closed chamber surrounding the article to be coated. One wall of this closed chamber is defined by the contoured portion of the vacuum die 50 which supports the porous article P. The other wall of this chamber is formed by the undercut lower surfaces of the chamber member 90. Vacuum applied through the ports 54 of the lower die continues to maintain sub-atmospheric pressure on the outer or exposed side of the material pressurizing it into contact with the pulp material. As the members close, however, pressurized fluid, such as air, supplied through the ports 106 at from 50 psi to 200 psi increases pressure in the closed chamber against the exposed surface of the sheet of thermoplastic material. Such pressurized fluid is heated as it passes the heater plate 98 in the chambers 108,104. Consequently, the pressure on the exposed side of the thermoplastic material is increased to a point substantially above atmospheric pressure for from 0.5 seconds to 10.0 seconds. Additionally, the temperature of the thermoplastic material at this time is brought to the range which is not yet as high as the pre-heated members 50, 90, but which is sufficiently high that fusing with the porous pulp material may occur. The pressure in the cavity acts against the thermoplastic material in every direction including the most sharply sloped or contoured walls. Similarly, the temperature is thus applied to the thermoplastic material by the heated fluid medium on the upper surface thereof in an evenly distributed manner precluding the possibility of scorching articles. When the fusion point is reached, the thermoplastic material bonds under heat and super-atmospheric pressure to the porous pulp material.

Elevating of the upper die 90 and its associated spacer ring 80 by means of the motor 24 and the lost motion connection 88, 118, respectively, permits removal of the excess thermoplastic material surrounding the coated article. Additionally, retraction of the squeeze ring 60 and disconnecting the vacuum applied through the ports 54 permits removal of the finished product from the die 50.

The improved article A formed of contoured porous pulp material P bonded to thermoplastic material T formed by the foregoing illustrative method and apparatus is described in detail in FIGS. 1-3. In FIG. 1, there is illustrated the finished product or article A described above as a partitioned eating plate. Such an article is used purely by way of example because it includes deep sloping contoured walls 132 near its edge, as well as irregularly and steeply angled contours at the ribs 134. The bottom or planar surfaces 136 of the central portion of the plate, as well as the relatively flat mid-portion of the sloped edge portion 132, connected to the top of the sloped edge portion 132, occupy generally horizontal planes. The outer peripheral margin 140 of the rim 138 of the plate is subject to increased wear from physical contact much as the rim of a drinking cup is subject to such contact to a greater extent than other portions thereof.

In FIG. 2, the rim 138 including its outer peripheral margin 140 is illustrated in enlarged fashion to show how the thermoplastic material T is intimately bonded to the upper surface thereof as at 142. Additionally, the outer vertical edge of the marginal rim 140 includes a single layer of thermoplastic material as at 144. On the lower side of the outer peripheral rim portion 140, a double layer 146 of thermoplastic material is bonded at 148 thereto. The edge 150 of thermoplastic material which was separated from the enlarged sheet originally employed bonds or melds with the adjacent layer of thermoplastic material to provide a double underwrapped thermoplastic coating on the rim of the porous pulp article.

In FIG. 3, a greatly enlarged cross-sectional elevational view of a fragment of the product A illustrates the intimate bond attained between the thermoplastic material T and the porous pulp material P. This illustrates a segment of an article such as the plate where the bottom or base wall 136 joins the sloping side wall 132. Additionally, on the right-hand portion of FIG. 3, the thermoplastic material has been forceably separated from the pulp material, breaking the bond there between, to further illustrate improved features of the article of the present invention.

In the left-hand portion of FIG. 3, it can be seen that the bond 142 occupies a zone which in the drawing is illustrated as approximately one-tenth the thickness of the thermoplastic material. The individual fibers 152 on the upper surface of the pulp material are in intimate physical contact with the lower surface of the thermoplastic material. Some thermoplastic material has melted or fused as at 154 around the uppermost fibers 152 at certain points along their length, while other portions 156 along their length are securely interfelted with other fibers in a slightly lower layer removed from the bonding zone. The temperature and pressure applied to the thermoplastic material was insufficient to render it liquid to the point where it was pressurized deeply into the pulp material, but was sufficient to attain a predetermined depth of penetration of the pulp material into the lower surface of the thermoplastic material. Also, as can be seen, the upper surface of the pulp material to which thermoplastic material has been pressure bonded is more even in contour than the roughened or "mountainous" surface 158 on the lower side of the article to which no thermoplastic material has been adhered.

It will also be noted from FIG. 3 that the thickness of thermoplastic material is substantially constant throughout its entire extent. Additionally, the extent of the bonding zone is constant across its entire extent. The bond attained on the sharply sloping contoured wall portion 132 is identical to that attained on the lower base wall 136.

In the right-hand portion of FIG. 3, where thermoplastic material T is shown forceably separated from the pulp material P, a number of pulp fibers 160 have pulled away from their interfelted association with other pulp fibers 162 which have remained with the pulp material. The fibers 160 are partly embedded as at 164 in the thermoplastic material. Additionally, a plurality of indentations 166 are noted on the lower surface of the thermoplastic material. Such indentations were formed by pressure contact with pulp fibers during the bonding process, and the fibers were sufficiently interfelted with adjacent fibers that they were not stripped therefrom when the thermoplastic material was forceably separated from the pulp material.

Additionally, the amount of pulp material adhering to the thermoplastic material when the two are forceably separated is substantially constant over a given unit of area such as one square centimeter. For instance, while the amount may be more or less depending upon the quality and nature of the pulp material and the thermoplastic material, and the temperature, time and pressure of bonding, the amount will be constant on the flat base wall portions 136 as well as on the sharply sloping contoured wall portions 130. In other words, the amount of force required to break the bond and separate the thermoplastic material from the pulp material is equal on the base as well as on the wall portions. If the thermoplastic material is originally transparent, for instance, the degree of translucence or "fuzziness" imparted thereto by pulp material adhering after forceable separation is substantially constant over the entire extent of thermoplastic material. The areas of separated thermoplastic material that coated sharply sloping wall portions do not contain significantly less pulp material than areas which coated flat base portions.

To further insure that persons skilled in the art may practice this invention, the following table of values is supplied to suggest relative temperatures, times and pressures for five different types of thermoplastic material useable with the above described method and apparatus. The values are relative only, and are in no sense to be construed as limiting the scope of the present invention, since it is apparent that each is entitled to its full range of equivalents. The molded pulp material (P) employed was after-pressed sheets very approximately one thirty-second inch thick in form of dished receptacles or containers.

THERMOPLASTIC MATERIAL (T)

|  | Polyethylene | Polypropylene | Polyester | Polystyrene | Polyamide |
|---|---|---|---|---|---|
| Thickness of thermoplastic sheet (T), mils | 1.0 | 1.0 | 0.5 | 1.0 | 1.0 |
| Temperature, chamber member (90), °F | 350 | 350 | 450 | 350 | 450 |
| Temperature, vacuum die (50), °F | 250 | 300 | 450 | 350 | 450 |
| Pressure, chamber (114), p.s.i | 100 | 100 | 100 | 100 | 100 |
| Vacuum die (58), inches Hg | 25 | 24 | 25 | 25 | 25 |
| Preheat time of materials (P, T) in machine, seconds | 5 | None | 10 | 20 | 10 |
| Time for machine to close chamber, seconds | 1.0 | 1.0 | 10.0 | 1.0 | 1.0 |
| Bonding time, seconds | 1.0 | 1.6 | 8.0 | 1.0 | 2.2 |

Thus, an invention in thermoplastic coating of molded pulp has been disclosed which suitably bonds thermoplastic material to porous material in an even coating sufficient for roughly handled articles on a mass production bases. The bond is attained by temperature and pressure acting for a predetermined time equally over the entire surface of the article in spite of the irregularity or sharpness of contoured portions thereof. The absence of mating male and female pressing dies results in a substantially reduced cost for the apparatus according to this invention, elimination of such tolerances enabling one machine to produce numerous articles having different shapes merely by replacing the suction die.

Additionally, when the desired temperature and pressure settings have been made, these values may remain constant cycle after cycle throughout a long production run without the necessity of varying these values during each cycle. The method of providing a double underwrap on the peripheral rim portions of articles such as eating plates results in a superior product heretofore unattainable on a mass production basis. Finally, the extent of bond between the thermoplastic material and the molded pulp material is advantageously constant on base as well as wall portions of articles, a fact easily attested to by forceably stripping thermoplastic material from the pulp material.

While the above described embodiments constitute preferred modes of practicing this invention, many other embodiments and equivalents may be resorted to within the scope of the actual invention, which is claimed as:

1. A method of coating a contoured portion of a generally porous molded pulp article with thermoplastic material which comprises placing a flat continuous sheet of generally imperforate thermoplastic material in overlying relationship with the contoured portion to be coated, raising the temperature of the thermoplastic material to a range where it becomes ductile and applying fluid pressure by means of a vacuum to closely conform the thermoplastic material to the contoured portion to be coated without pleats or folds, and continuing to raise the temperature of the thermoplastic material to a bonding range and increasing the fluid pressure to at least twice atmospheric pressure to attain a mechanical bond of the thermoplastic material which penetrates the surface layers of the molded pulp article.

2. A method of coating a contoured portion of a generally porous molded pulp article with thermoplastic material which comprises placing the article to be coated against an open-face suction die, placing a flat continuous sheet of generally imperforate thermoplastic material in overlying relationship with the exposed portion of the die-supported article, raising the temperature of the thermoplastic material to the range where it is sufficiently ductile to closely conform with the contoured portion of the molded pulp article, suction adhering the thermoplastic material into intimate physical contact with the article without pleats or folds, creating a closed chamber around the article and its adhered thermoplastic material with the open-face suction die forming a portion thereof, increasing the pressure within the chamber to act against the exposed portion of the thermoplastic material with a pressure at least twice atmospheric pressure, and continuing to raise the temperature of the thermoplastic material until it effects a mechanical bond with the contacted pulp.

3. A method of coating a molded pulp article with thermoplastic material as in claim 2 wherein the temperature of the molded pulp article itself is raised until the thermoplastic material effects a mechanical bond therewith.

4. A method of coating a contoured portion of a generally porous molded pulp article with thermoplastic material as in claim 2 wherein the flat continuous sheet of generally imperforate thermoplastic material is from about 0.5 to about 1.0 mil in thickness, the porous molded pulp article comprises an after-pressed sheet approximately one thirty-second of an inch thick, the sheet of molded pulp material and the sheet of thermoplastic material are first heated for a time not exceeding about 20 seconds, and the temperature is thereafter raised to a bonding range from about 250° F. to about 450° F. for a time not exceeding about 18.0 seconds with the fluid pressure applied in the range of about 100 p.s.i. and the suction being in the range of about 25 inches of mercury.

5. A method of coating a dish shaped generally porous molded pulp article having a laterally outwardly flanged marginal rim portion therearound with thermoplastic material which comprises placing a continuous sheet of generally imperforate thermoplastic material in overlying relationship with one side of the article, raising the temperature of the thermoplastic material to the range where it is sufficiently ductile to closely conform with the molded pulp article, suction adhering the thermoplastic material into intimate physical contact with the one side of the article and with the outer peripheral edge of the rim portion as well as with the other side of the rim portion in doubled-back underlying relationship, and continuing to raise the temperature of the thermoplastic material to the bonding point while applying pressure to effect a mechanical interlocking of pulp material and thermoplastic material at their interface.

* * * * *